United States Patent Office 3,383,194
Patented May 14, 1968

3,383,194
m-UREIDOPHENYL ESTERS OF O,O-DIMETHYL PHOSPHOROTHIOIC ACID AS HERBICIDES
Sanford T. Young, Lockport, N.Y., assignor to FMC Corporation, New York, N.Y., a corporation of Delaware
No Drawing. Filed Dec. 22, 1964, Ser. No. 420,452
4 Claims. (Cl. 71—87)

ABSTRACT OF THE DISCLOSURE

Herbicidal compositions containing as an active ingredient O,O-dimethyl O-[m-(3,3-dimethylureido)phenyl] phosphorothioate. Synthesis of the new compound and herbicidal effectiveness against a variety of plants are described.

This invention relates to a novel herbicidal compound, to new herbicidal compositions, and to a new method for the control of undesired plant growth, both pre-emergently and post-emergently, by application of new and useful herbicidal compositions.

The new herbicidal compound of this invention is the compound O,O - dimethyl O -[m- (3,3 - dimethylureido) phenyl] phosphorothioate, of the formula:

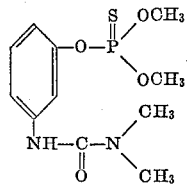

This compound, when formulated as an essential active ingredient of herbicidal compositions, and applied either pre-emergently or post-emergently, has excellent herbicidal properties.

O,O-dimethyl O-[m-(3,3-dimethylureido)phenyl] phosphorothioate may be prepared from m-aminophenol by reaction of the amino and the hydroxyl functional groups with the appropriate reagents to produce phosphates and urea derivatives. For example, O,O-dimethyl phosphorochloridothioate may be reacted with the intermediate 3-(m-hydroxyphenyl)-1,1-dimethylurea, which in turn may be prepared by the reaction of dimethyl-carbamoyl chloride with m-aminophenol. Procedures adaptable to the preparation of this phosphorothioic acid ester are described by G. M. Kosolapoff, "Organophosphorus Compounds," Chapter 9, John Wiley and Sons, Inc., New York, 1950, and the urea derivative may be prepared employing the procedures for the preparation of amides from acyl halides as described by L. C. Raiford and K. Alexander, J. Org. Chem., 5, 300–12 (1940). In carrying out these reactions, the urea derivative is normally prepared prior to the phosphate ester, to avoid reaction of the free amino group with the phosphorochloridothioate; however, this reaction sequence could be reversed by protecting the amino group during the preparation of the phosphate ester, and then acylating the intermediate O,O-dimethyl O-(m-aminophenyl) phosphorothioate.

The preparation of O,O-dimethyl O-[m-(3,3-dimethylureido)-phenyl] phosphorothioate is illustrated below. All temperatures are expressed in degrees centigrade.

Example 1.—Synthesis

The intermediate 3-(m-hydroxyphenyl)-1,1-dimethylurea was prepared as follows: A solution of 22.9 g. of m-aminophenol and 11.8 g. of dimethylcarbamoyl chloride in 200 ml. of 1,2-dimethoxyethane was allowed to stand at room temperature for three days. The reaction mixture was concentrated to dryness under vacuum, and the residual oil was mixed with water. The tarry solid which separated was washed with water and dried to yield 15.5 g. of crude product melting at 198–200°. Recrystallization from ethanol gave 12.0 g. of 3-(m-hydroxyphenyl)-1,1-dimethylurea melting at 200–1°.

This phenol was converted to the sodium salt as follows: A suspension of 18.0 g. of 3-(m-hydroxyphenyl)-1,1-dimethylurea in 50 ml. of methanol was added to a solution of 5.4 g. of sodium methoxide in 75 ml. of methanol. The methanol was removed under vacuum and the residual solid was washed twice with benzene and dried over phosphorus pentoxide at a pressure of 0.2 mm. This sodium salt of 3-(m-hydroxyphenyl)-1,1-dimethylurea had a melting point above 315°.

This product was reacted with O,O-dimethyl phosphorochloridothioate as follows: A mixture of 20.0 g. of the sodium salt of 3-(m-hydroxyphenyl)-1,1-dimethylurea, and 17.0 g. of O,O-dimethyl phosphorochloridothioate in 125 ml. of dry benzene was stirred at room temperature for four days. The volatile material was removed by distillation at 130° (10 mm.) and the residual oil was dissolved in toluene. This solution was washed with 5% sodium bicarbonate solution and with water, and dried over sodium sulfate. The solvent was removed and the sample was dried by heating at 60° (0.2 mm.) for four hours. A yield of 24.5 g. of O,O-dimethyl O[m - (3,3 - dimethylureido)phenyl] phosphorothioate, a red oil, was obtained.

*Analysis.*—Calc'd for $C_{11}H_{17}N_2O_4PS$: C, 43.41; H, 5.63; N, 9.20. Found: C, 43.24; H, 5.74; N, 9.22.

For herbicidal applications, the active ingredient of this invention may be utilized in diverse formulations, including the adjuvants and carriers normally employed for facilitating the dispersion of active ingredients for agricultural applications, recognizing the fact that the formulation and mode of application of a toxicant may affect the activity of the material in a given application. Thus, O,O-dimethyl O-[m-(3,3-dimethylureido)phenyl] phosphorothioate may be formulated as a granule of relatively large particle size, as a powdery dust, as a wettable powder, as an emulsifiable concentrate, as a solution, or as any of several other known types of formulations, depending on the desired mode of application. For pre-emergence application these herbicidal compositions are usually applied as sprays, dusts or granules in the area in which suppression of vegetation is desired. For post-emergence control of established plant growth, sprays or dusts are most commonly used. These formulations may contain as little as 0.5% or as much as 95% or more by weight of active ingredient.

Dusts are admixtures of the active ingredient with finely divided solids such as talc, attapulgite clay, kieselguhr, and other organic and inorganic solids which act as dispersants and carriers for the toxicant; these finely divided solids have an average particle size of less than about 50 microns. A typical dust formulation, useful herein, is one containing 1.0 part of O,O,-dimethyl O-[m-(3,3-dimethylureido)phenyl] phosphorothioate and 99.0 parts of talc.

Wettable powders, also useful formulations for both pre- and post-emergence herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing or emulsifying agent to facilitate dispersion. For example, a useful wettable powder formulation contains 80.8 parts O,O-dimethyl O-[m-(3,3-dimethyluredio)phenyl] phosphorothioate, 17.9 parts of Palmetto clay and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions which are dispersible in water or other dispersant, and may consist entirely of O,O-dimethyl O-[m-(3,3-dimethylureido)phenyl] phosphorothioate with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general comprises 0.5 to 95% of active ingredient by weight of the herbicidal composition.

Typical wetting, dispersing or emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1% to 15% by weight of the herbicidal composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

The formulation and application of the herbicide of this invention is illustrated further in the following examples:

Example 2.—Pre-emergence application

The pre-emergence herbicidal activity of O,O-dimethyl O-[m-(3,3-dimethylureido)phenyl] phosphorothioate was demonstrated as follows: In flat pans was placed, to a depth of three inches, a 1:1 mixture of silt loam and sandy loam soil. In the soil were then planted seeds of mustard (*Brassica juncea*), lettuce (*Lactuca sativa*), and carbgrass (*Digitaria sanguinalis*) at a depth of one-fourth to one-half inch, and seeds of lima bean (*Phaseolus limensis*) and corn (*Zea mays*) at a depth of approximately one inch. These plant species are representative of a broad spectrum of plant species. As soon as the seeds were planted and the flats watered, the toxicant was sprayed on the soil as an acetone-water solution, at a rate equivalent to eight pounds of toxicant per acre. Both the treated flats and an untreated control were held in the greenhouse for three weeks, after which time the performance of the toxicant was assessed in terms of percent kill with respect to the untreated control. Results are presented in Table 1 below:

TABLE 1.—PRE-EMERGENCE HERBICIDAL ACTIVITY

Test plant species: Percent kill
  Lima bean _____ [1] 80
  Corn _____ 0
  Lettuce _____ [1] 90
  Mustard _____ 100
  Crabgrass _____ 80

[1] Surviving plants injured and will probably die.

The above results indicate effective pre-emergence activity, as well as selectivity, of the subject herbicide.

Example 3.—Post-emergence application

The post-emergence herbicidal activity of O,O-dimethyl O-[m - (3,3 - dimethylureido)phenyl] phosphorothioate was demonstrated as follows: In flat pans was placed, to a depth of three inches, a 1:1 mixture of silt loam and sandy loam soil. In the soil were then planted seeds of lima bean and corn at a depth of approximately one inch, and seeds of mustard, lettuce and crabgrass at a depth of one-fourth to one-half inch. These plant species are representative of a broad spectrum of plant species. The flats were watered, and the seeds allowed to grow in the greenhouse for three weeks. Maintaining an untreated control, the stand of plants was then sprayed with a solution of O,O-dimethyl O-[m-(3,3-dimethylureido)phenyl] phosphorothioate in aqueous acetone, at a rate equivalent to eight pounds of toxicant per acre. Both treated and untreated plants were held in the greenhouse for two to three weeks, after which the number of surviving plants were counted, and the percent kill with respect to the untreated control was estimated. Results are presented in Table 2 below:

TABLE 2.—POST-EMERGENCE HERBICIDAL ACTIVITY

Test plant species: Percent kill
  Lima bean _____ 100
  Corn _____ 0
  Lettuce _____ 100
  Mustard _____ 100
  Crabgrass _____ 100

These results show this compound to be an unusually active and selective post-emergence herbicide.

The active herbicidal compound of this invention may be formulated and/or applied with insecticides, fungicides, nematocides, plant growth regulators, fertilizers, and other agricultural chemicals, and as an effective soil sterilant as well as an herbicide. In applying the active compound of this invention, whether formulated alone or with other agricultural chemicals, an effective amount and concentration of O,O-dimethyl O-[m-(3,3-dimethylureido)phenyl] phosphorothioate is of course employed.

It is apparent that various modifications may be made in the formulation and application of the novel compound of this invention, without departing from the inventive concept herein, as defined in the following claims.

I claim:

1. Herbcidal composition comprising as an essential active ingredient 0.5 to 95% by weight of O,O-dimethyl O-[m-(3,3-dimethylureido)phenyl] phosphorothioate, and an inert carrier in admixture therewith.

2. Method of controlling undesired plant growth which comprises applying an herbicidal amount of O,O-dimethyl O-[m-(3,3-dimethylureido)phenyl] phosphorothioate to the locus of the undesired plant growth.

3. Method of controlling undesired plant growth prior to emergence of said growth which comprises applying an herbicidal amount of O,O-dimethyl O-[m-(3,3-dimethylureido)phenyl] phosphorothioate to the soil wherein control of undesired plant growth is to be effected.

4. Method of controlling undesired plant growth after emergence of said growth from the soil which comprises applying an herbicidal amount of O,O-dimethyl O-[m-(3,3-dimethylureido)-phenyl] phosphorothioate to said undesired plant growth.

References Cited

UNITED STATES PATENTS 2,638,478  5/1953  Morrison et al. _____ 260—456
2,795,610  6/1957  Gerjovich _____ 71—2.6 XR
3,197,496  7/1965  Suer _____ 71—2.3 XR LEWIS GOTTS, *Primary Examiner.*

JAMES O. THOMAS, JR., *Examiner.*

G. HOLLRAH, *Assistant Examiner.*